(12) United States Patent
Caretta et al.

(10) Patent No.: US 7,770,622 B2
(45) Date of Patent: Aug. 10, 2010

(54) PLANT FOR PRODUCING TYPES OF TYRES DIFFERENT FROM EACH OTHER

(75) Inventors: Renato Caretta, Gallarate (IT); Fiorenzo Mariani, Biassono (IT)

(73) Assignee: Pirelli Pneumatici S.p.A., Milan (IT)

( * ) Notice: Subject to any disclaimer, the term of this patent is extended or adjusted under 35 U.S.C. 154(b) by 298 days.

(21) Appl. No.: 11/115,138

(22) Filed: Apr. 27, 2005

(65) Prior Publication Data

US 2005/0194101 A1 Sep. 8, 2005

Related U.S. Application Data

(60) Division of application No. 10/159,007, filed on Jun. 3, 2002, now Pat. No. 6,908,523, which is a continuation of application No. PCT/EP00/11599, filed on Nov. 21, 2000.

(60) Provisional application No. 60/168,753, filed on Dec. 6, 1999.

(30) Foreign Application Priority Data

Dec. 1, 1999 (EP) .................................. 99123860

(51) Int. Cl.
*B29D 30/10* (2006.01)
(52) U.S. Cl. ........................................ 156/396; 156/111
(58) Field of Classification Search .................. 156/111, 156/117, 396, 397, 130, 133, 415; 425/34.1, 425/38
See application file for complete search history.

(56) References Cited

U.S. PATENT DOCUMENTS

| | | | |
|---|---|---|---|
| 1,818,955 A | 8/1931 | Maas | |
| 3,532,577 A * | 10/1970 | Niclas et al. | 156/405.1 |
| 3,767,509 A * | 10/1973 | Gazuit | 156/415 |
| 4,443,290 A | 4/1984 | Loeffler et al. | |
| 4,728,274 A * | 3/1988 | Siegenthaler | 425/34.1 |
| 4,877,468 A | 10/1989 | Siegenthaler | |
| 4,963,207 A | 10/1990 | Laurent | |
| 5,853,526 A * | 12/1998 | Laurent et al. | 156/396 |
| 5,908,531 A | 6/1999 | Laurent | |

(Continued)

FOREIGN PATENT DOCUMENTS

EP 0448407 A2 9/1991

(Continued)

*Primary Examiner*—Geoffrey L Knable
(74) *Attorney, Agent, or Firm*—Finnegan, Henderson, Farabow, Garrett & Dunner, L.L.P.

(57) ABSTRACT

A plant for producing types of tyres different from each other includes a manufacturing unit including a plurality of work stations, devices for transfer and movement of the tyres being produced, and a vulcanizing unit including vulcanizing moulds for the tyres being produced. Each work station is designed to assemble at least one corresponding structural component on at least one type of tyre being produced. The devices for transfer and movement operate between the work stations and provide selective movement for each of the types of tyres being produced in proximity to corresponding work stations. The plant may also include a central processing unit. The central processing unit may control the devices for transfer and movement to coordinate processing stages for each type of tyre in the manufacturing unit and in the vulcanizing unit. Additionally, the plant may include holding stations associated with at least some of the work stations.

18 Claims, 2 Drawing Sheets

U.S. PATENT DOCUMENTS

| | | | |
|---|---|---|---|
| 6,173,892 B1 * | 1/2001 | Kimijima | 235/385 |
| 6,702,912 B1 | 3/2004 | Oku et al. | |
| 6,738,686 B2 * | 5/2004 | Caretta et al. | 700/213 |

FOREIGN PATENT DOCUMENTS

| | | | |
|---|---|---|---|
| EP | 0776756 A2 | | 6/1997 |
| EP | 98830472 | | 7/1998 |
| EP | 0875364 A2 | | 11/1998 |
| EP | 98830662 | | 12/1998 |
| EP | 98830762 | | 2/1999 |
| EP | 0922561 A2 | | 6/1999 |
| EP | 0943421 A1 | | 9/1999 |
| JP | 08011232 A | * | 1/1996 |
| WO | WO-00/35666 A1 | * | 6/2000 |

* cited by examiner

PLANT FOR PRODUCING TYPES OF TYRES DIFFERENT FROM EACH OTHER

CROSS-REFERENCE TO RELATED APPLICATIONS

This application is a divisional application of U.S. patent application Ser. No. 10/159,007, filed Jun. 3, 2002, now U.S. Pat. No. 6,908,523 which is a continuation of International Patent Application No. PCT/EP00/11599, filed Nov. 21, 2000, in the European Patent Office, the contents of both of which are relied upon and incorporated herein by reference. Applicants also claim the right of priority under 35 U.S.C. §119(a)-(d) based on patent application No. 99123860.1, filed Dec. 1, 1999, in the European Patent Office. Additionally, Applicants claim the benefit under 35 U.S.C. §119(e) based on prior-filed, copending provisional application No. 60/168,753, filed Dec. 6, 1999, in the U.S. Patent and Trademark Office.

BACKGROUND OF THE INVENTION

1. Field of the Invention

The present invention relates to a method for producing tyres which are different from each other within one production plant.

2. Description of the Related Art

A tyre for vehicle wheels normally comprises a carcass structure, essentially consisting of one or more carcass plies shaped in an essentially toroidal configuration and having their axially opposing lateral edges engaged with corresponding annular reinforcing structures incorporating circumferentially inextensible inserts usually called "bead wires". Each annular reinforcing structure is incorporated in what is known as a "bead" formed along an inner circumferential edge of the tyre for fixing the tyre to a corresponding mounting rim.

A belt structure, comprising one or more strips of belt in the shape of a closed loop, essentially consisting of textile or metal cords suitably orientated with respect to each other and with respect to the cords belonging to the adjacent carcass plies, is applied to the carcass structure in a radially external position.

A tread band, normally consisting of a strip of elastomeric material of suitable thickness, is also applied to the belt structure in a radially external position.

It should be noted that, for the purposes of the present description, the term "elastomeric material" denotes the rubber mixture in its entirety, in other words the whole material formed by at least one polymer base suitably amalgamated with reinforcing fillers, and/or process additives of various types.

A pair of sidewalls, each of which covers a lateral portion of the tyre lying between what is called a shoulder area, located near the corresponding lateral edge of the tread band, and the corresponding bead, is applied to the opposite sides of the tyre.

Given the above, it should be noted that each type of tyre is essentially distinguished from the others by a set of chemical and physical, structural, dimensional and appearance characteristics.

The chemical and physical characteristics essentially relate to the type and composition of the materials, and particularly to the recipes of the various mixtures used in the production of the elastomeric materials. The structural characteristics essentially define the number and type of the structural components present in the tyre, and their positioning with respect to each other in the structure of the tyre. The dimensional characteristics relate to the geometrical measurements and to the cross-sectional profile of the tyre (external diameter, maximum chord or width, sidewall height and their ratio, in other words the section ratio) and will be indicated simply as "specification" hereafter. The appearance characteristics consist of the design on the rolling surface of the tread, the ornamental patterns and the various pieces of wording or distinctive signs reproduced on the tyre, for example on the sidewalls of the tyre, and will be indicated as a whole as "tread design" in the remainder of the present description.

The conventional production processes essentially comprise four distinct stages in the manufacture of tyres:

a) preparation of the mixtures,
b) production of the individual structural components,
c) assembly of the different structural components in succession, to produce a crude tyre on a drum or other suitable support,
d) vulcanization of the crude tyre with simultaneous stamping of the tread design on the external surface of the tyre.

For the purposes of the present invention, "type of tyre" denotes a tyre having a given specification, given structural components of which it consists, and a given tread design.

In an effort to reduce production costs, technological development has been basically orientated towards the search for technical solutions which would lead to the production of increasingly fast and reliable machinery, in such a way as to minimize the time required to produce each tyre, while maintaining or improving the quality of the finished product.

Thus, plants with high production capacity in terms of pieces produced per unit of time have been produced, using tyre manufacturing machinery which has reduced options for modification (or in other words, is capable of producing only a limited range of types of tyre), but which maximize the serial production of tyres having identical structural characteristics. Purely by way of example, in the most up-to-date plants the output can be up to approximately two carcasss per minute, and the average batch output in one month of operation for each article (type of tyre) can be 3200 pieces, with an article-changeover time of 375 minutes.

Attempts have also been made to reduce or eliminate the storage of the semi-finished products present between one and another of the four process stages listed above, in such a way as to minimize the costs and problems involved whenever the type of tyre in production has to be changed. For example, the document EP 922561 proposes a method for controlling tyre production, in which, in order to reduce or eliminate both the crude tyre storage time and the number of crude tyres being stored, a complex vulcanizing unit is provided, with a number of moulds suitable for constantly absorbing the output of the complex tyre manufacturing unit. The production of tyres of different types, particularly those having different specifications, is achieved by replacing and/or adapting from time to time the machinery provided in the complex tyre manufacturing unit, in conjunction with the replacement of the moulds in the complex vulcanizing unit.

The applicant has found that, in all cases, the production of the tyres entails costs which increase with the variety of types of tyre to be produced: in particular, it is necessary to intervene in the processes and/or mixture production plants to permit the production of components with new and different physical and chemical characteristics and/or in the production plants of the individual structural components to change the specification of the tyres being produced. It is also necessary to change the operating sequence (different assembly method) and/or the equipment and adjustment of the manufacturing machinery whenever a change is made in the structure and/or the specification of the tyre to be produced.

Finally, it is necessary to have at least one vulcanizing mould for each different tread design-specification pair.

All of the above entails continuing costs for the purchase of moulds with different specifications and different tread designs, and of different equipment, costs for introducing the latter, losses of output due to machine downtime (a change of process or equipment generally causes machine downtime), and waste of material. For example, in the case of continuous production of components, machine downtime of downstream plants and/or a change in the characteristics of the components generates excess production which has to be rejected, since it is impossible to re-use it.

Given these circumstances, in the applicant's opinion the production of a large number of types of tyre in a single plant is generally undesirable, particularly if the objective of minimizing costs is to be pursued. In fact, this objective is incompatible with a frequent change of equipment and production processes. When production processes of the conventional type are used, the applicant has observed that, where the volume of sales of each individual type is sufficiently high, the number of the production plants can be multiplied in such a way as to make it possible to produce a different type continuously in each plant, thus minimizing the aforesaid disadvantages. On the other hand, where the volumes of sales forecast for specific types are not particularly high, for example on an annual basis, it is also possible in each case to carry out the whole production for at least one year immediately and continuously, to contain the production costs for these types. This system may, however, affect the quality of the sold product, and tends to increase storage costs, since the products remain in stock for a long period. The risk associated with sales also increases, for example as a result of unforeseen rapid obsolescence of the product, and there is an increase in the financial costs of capital tied up in the stocks of the product and in the installation of the moulds which are to be used only for the restricted period necessary to complete the production of the forecast reduced volume.

In order to tackle these problems, the applicant has already developed a production method in which each series of tyres identical to each other as regards production is broken down into daily lots, each comprising a quantity of tyres sufficient to cover the daily output of one mould. In this way the production of tyres having different specifications and/or different constructional characteristics is optimized by eliminating the storage of large quantities of crude and vulcanized tyres. This method is described in European patent application EP 875364 in the name of the present applicant.

In a tyre production plant, the stage of vulcanization of the tyre is carried out in a period which is essentially identical for ranges of all the types of tyres, but on the other hand the tyre manufacturing time differs considerably according to the type of tyre to be produced. Additionally, the application of even a single component takes different lengths of time for different types of tyre.

This impedes a frequent change of type within the plant described above, since the creation of waiting times for the vulcanization stage would occur whenever a tyre to be vulcanized belonged to a different type from that preceding it in the crude tyre processing sequence.

Moreover, a frequent change of type of tyre within one processing batch also entails a frequent change of the equipment for making the different types, thus further increasing the waiting times.

For the purposes of the present invention, the term "serial processing plant" denotes a plant in which the individual stages of processing of the tyre are carried out in a fixed sequence, in other words in which each tyre processing stage starts immediately after the preceding stage has ended.

The applicant has observed that, in a serial processing plant, the total production process time is dependent on the slowest processing stage.

For the purposes of the present invention, the term "critical processing period" denotes a processing period in which no changes are planned in the equipment during the tyre processing sequence.

SUMMARY OF THE INVENTION

The applicant has tackled the problem of controlling the functions of the plant in such a way as to produce, within a single critical period, types of tyres which are different from each other, while minimizing the waiting times which are due primarily to the difference in the rates of the vulcanization and crude tyre manufacturing stages between tyres of different types.

According to the present invention, the applicant has provided a tyre production plant in which different types of tyre can be produced within the same critical processing period without increasing the waiting times.

More particularly, the applicant has found that, in a plant for manufacturing crude tyres of different types by the successive assembly of elementary components on toroidal drums of predetermined dimensions, it is possible to keep the flow of crude tyres to the vulcanization stage essentially constant by selecting a pre-set sequence of introducing drums corresponding to different types of tyres into the plant, and by alternating the processing of types which require longer times with the processing of types which require shorter times. The processing sequence of a critical period is determined according to the number and types of tyre which are to be produced within the said critical period.

Therefore, once the number of tyres to be produced for each type within a critical period has been decided, it is possible to determine a sequence for introducing the types of drums into the plant and a sequence for the various processing stages which make it possible to keep the average time for producing the quantity of crude tyres for this critical period essentially constant. In a plant of this kind, the processing and the sequence of depositing the various components on the drum are not the same for all the types of tyre, and, at the same time, different types of tyre are produced within the same critical period.

One aspect of the present invention relates to a method for producing types of tyres which are different from each other, comprising the steps of:

producing a plurality of structural components of tyres in production;

manufacturing types of tyre by assembling these structural components according to predetermined successive processing steps, in the proximity of corresponding work stations arranged in a complex manufacturing unit within which the tyres being processed are moved by the transfer of the tyres from each work station to the next;

transferring the manufactured tyres to a complex vulcanizing unit;

vulcanizing the tyres in corresponding vulcanizing moulds associated with the said vulcanizing line, characterized in that the stage of manufacturing the types of tyre comprises:

providing at least one series of tyres to be produced, comprising a sequence of tyres consisting of at least a first and a second type of tyre arranged in a predetermined order, modifying the order of the said series in at least one work station.

Preferably, the transfer of the tyres from the complex manufacturing unit to the complex vulcanizing unit takes place at a rate equal to the rate of transfer of the tyres to each of the said work stations.

In particular, the said series comprises a tyre of the said first type followed by at least one tyre of the said second type, such that the sum of the times for the processing of the first type of tyre by the said at least one work station, in which the tyres of the second type undergo the same processing at least twice, up to the end of the manufacturing of the crude tyre, is shorter than the said rate by a time corresponding to the difference in the processing time required by the said types at the said at least one work station.

The production of each structural component is carried out in the complex manufacturing unit by the processing of at least one basic semi-finished product, identical for each type of tyre and supplied in predetermined quantities according to the type of tyre to be produced.

The structural components of each type of tyre are assembled on a toroidal support whose profile essentially reproduces the internal configuration of the type of tyre in question.

Preferably, during the manufacturing step each toroidal support is supported and transferred between at least two adjacent work stations by a robotic arm.

In particular, each tyre is transferred into the complex vulcanizing unit together with the corresponding toroidal support.

In particular, at least one of the said structural components is produced directly on the tyre being processed, during the said assembly step.

The production of each structural component is preceded by a step of identifying the type of tyre being processed which has been transferred to the corresponding work station.

The identification step is implemented by the reading of a code associated with a supporting member of the tyre being processed.

Preferably, a plurality of structural components is assembled in at least one of the said work stations, in corresponding processing units.

Preferably, the said manufacturing line extends along a path in the form of a closed loop, along which the tyres being processed are made to advance.

A further aspect of the present invention relates to a plant for producing types of tyre which are different from each other, comprising:
 a complex manufacturing unit having a plurality of work stations, each designed to assemble at least one corresponding structural component on at least one type of tyre being processed;
 devices for the functional transfer and movement of tyres being processed, operating between the said work stations;
 a complex vulcanizing unit having vulcanizing moulds for the manufactured tyres, characterized in that the said functional transfer and movement devices provide the selective movement for each type of tyre within a work station.

Preferably, the said selective movement comprises the movement of each type of tyre between the work stations according to a pre-set sequence.

Preferably, the said functional transfer and movement devices operate between the complex manufacturing unit and the complex vulcanizing unit to transfer the manufactured tyres to the latter, at a rate of transfer equal to the rate of transfer of the tyres to each of the work stations arranged along the line of the complex manufacturing unit.

In particular, each of the said work stations comprises:
 feed devices for supplying at least one basic element for producing the said at least one structural component of the tyre,
 application devices for applying the said structural component to the tyre being processed, this structural component being produced with the use of the said basic element in a quantity predetermined according to the type of tyre to be produced.

In particular, each of the said work stations is associated with:
 devices for identifying the type of tyre being processed in the work station concerned;
 selection devices for determining the quantity of basic elements to be used for the production of the structural component of the tyre being processed.

Preferably, the said identification devices comprise at least one sensor located on the complex manufacturing unit and designed to read at least one code associated with a supporting member of each tyre being processed.

Preferably, the said functional transfer and movement devices operate on toroidal supports on which the tyres are formed, to sequentially transfer each tyre being processed between the work stations arranged along the line of the complex manufacturing unit and to the complex vulcanizing unit.

In particular, the said transfer devices comprise at least one robotic arm associated with at least one of the said work stations.

At least one of the said robotic arms comprises pick-up and driving members operating on the said toroidal support to hold it in front of the corresponding work station and to make it rotate about one of its own geometrical axes during the assembly of the said at least one structural component.

At least one of the said work stations comprises a plurality of processing units, each responsible for the assembly of a corresponding structural component on each tyre being processed.

A further aspect of the present invention relates to a plant for producing types of tyre which are different from each other, characterized in that it comprises:
 a complex manufacturing unit having a plurality of work stations, each designed to assemble at least one corresponding structural component on at least one type of tyre being processed,
 a complex vulcanizing unit, having vulcanizing moulds for the types of tyre which have been manufactured,
 devices for the functional transfer and movement of the tyres being processed, operating between the said work stations and the complex vulcanizing unit,
 a central processing unit capable of controlling the said functional transfer and movement devices in such a way as to co-ordinate the stages of processing of each type of tyre in the complex manufacturing unit and in the complex vulcanizing unit.

A further aspect of the present invention relates to a plant for producing types of tyre which are different from each other, characterized in that it comprises:
 a complex manufacturing unit having a plurality of work stations, each designed to assemble at least one corresponding structural component on at least one type of tyre being processed,
 a complex vulcanizing unit, having vulcanizing moulds for the types of tyre which have been manufactured, devices for the functional transfer and movement of the tyres being processed, operating between the said work stations and the complex vulcanizing unit, holding stations associated with the said work stations, the number of the said holding stations, of the said moulds, and of the said functional transfer and movement devices being selected with respect to each other in order to obtain series corresponding to the number of tyres of each type to be produced.

BRIEF DESCRIPTION OF THE DRAWINGS

Further characteristics and advantages will be made clear by the following detailed description of the present invention.

DETAILED DESCRIPTION OF THE EXEMPLARY EMBODIMENTS

The plant 1 comprises a complex manufacturing unit 2 for producing a crude tyre, in which each tyre being processed is manufactured by the assembly of its structural components in a predetermined sequence, and a complex vulcanizing unit 3 in which each tyre arriving from the complex manufacturing unit 2 is vulcanized within a corresponding mould 34, 35, 36, 37, 38, 39.

Figure 1:
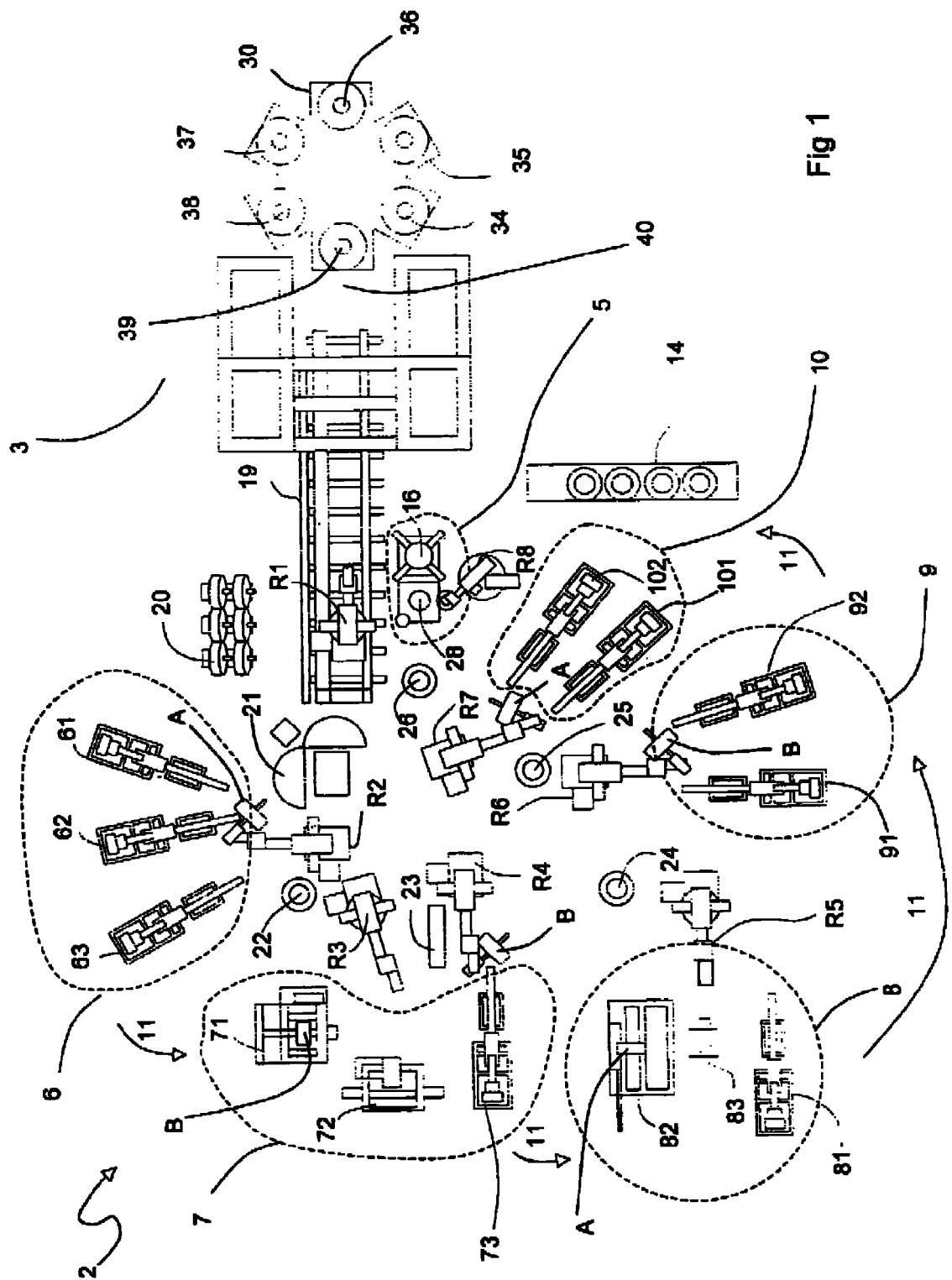
FIG. 1 shows a layout of the plant according to the present invention, indicated as a whole by the number 1.

The complex manufacturing unit 2 comprises a plurality of work stations 5, 6, 7, 8, 9, 10 arranged consecutively along a processing path, preferably of the closed loop type, shown for guidance by the arrows 11 in the attached FIG. 1. This line also has a feed station 20, a temperature stabilizing device 21, a first holding station 22, a multiple holding station 23, a second holding station 24, a third holding station 25 and a terminal holding station 26.

The work stations 5, 6, 7, 8, 9, 10 are capable of operating simultaneously, with each operating on at least one tyre being processed, to assemble at least one of its structural components on to the tyre.

More particularly, during the assembly stages the various structural components used in the production of each tyre are conveniently engaged on a supporting member, preferably consisting of a toroidal support or drum whose profile essentially reproduces the internal configuration of the tyre to be produced. This toroidal support is made in such a way that it can easily be removed from the tyre when the processing has been completed.

At least a first and a second type of tyre can be treated simultaneously in both the complex manufacturing unit 2 and in the complex vulcanizing unit 3. By way of example, in the following description, with reference to the layout shown in the attached FIGS. 1 and 2, two different types of tyre, differing from each other in their dimensional characteristics, are treated simultaneously. Clearly, it is also possible to operate simultaneously on a different number of types which may have, in addition or as an alternative to dimensional differences, differences in terms of structural components and/or chemical and physical characteristics and/or appearance.

In the layout shown for guidance in the attached figures, the toroidal supports are shown without distinction between them and the tyres being processed which are engaged on them, and are identified by the letters A and B, each of which denotes a specific type of tyre.

As may be noted, the tyres being processed are distributed along the line of the complex manufacturing unit 2 in such a way that the different types A and B succeed each other in a pre-set sequence. Additionally, the pre-set sequence of tyres to be produced within a critical period can be divided into a plurality of series having the same sequence of tyres or having a different sequence, according to the types which are to be produced in each series. In the example shown in FIG. 1, a series comprising six tyres, A, B, B, A, B, A, is distributed along the line of the production plant 1. In this example, a total of six toroidal supports, on each of which a corresponding tyre is manufactured, are therefore operated within the complex manufacturing unit 2.

It should be noted that, for the purposes of the present description, the term "series" denotes a set of tyres of different types or of the same type, which follow each other in a predetermined sequence. In the complex manufacturing unit 2 it is possible to provide, for example, a plurality of series, each consisting of different types of tyre, which advantageously succeed each other cyclically, for example according to the pattern A, B, A, B, or series each of which advantageously consists of a tyre of a first type interposed between two tyres of a second type, or series each of which consists of tyres which are all of the same type.

Devices for the functional transfer and movement of the tyres operate in the plant to sequentially transfer each of the tyres being processed A and B from one of the work stations 5, 6, 7, 8, 9, 10 of the complex manufacturing unit 2 to the next, and to the complex vulcanizing unit 3. The said devices also functionally move the toroidal support during the deposition of at least one of the structural components.

Preferably, these devices comprise one or more robotic arms R1, R2, R3, R4, R5, R6, R7 and R8, each of which is associated with at least one of the work stations 5, 6, 7, 8, 9, 10 and is capable of operating on the individual toroidal supports A or B, to carry out the sequential transfer of each tyre being processed.

The tyre is fabricated by moving the toroidal support and orientating it in space and applying the extruded structural components thereon by both circumferential and axial deposition.

The said robotic arms advantageously support the said toroidal supports so that they project, in other words by gripping them at only one side on the axis of rotation, thus enabling the various components to be deposited over the whole of the axial extension of the support which has a curvature with two bends.

A processing unit commands the transfers along the said loop path and determines the number and composition of the said series of tyres within a desired critical period. This unit is capable of controlling the said functional transfer and movement devices in such a way as to co-ordinate the stages of processing on each type of tyre in the complex manufacturing unit 2 and in the complex vulcanizing unit 3.

More particularly, in the illustrated embodiment there is a first robotic arm R1, movable along a guide structure 19 if necessary, and operating between the complex manufacturing unit 2 and the complex vulcanizing unit 3, to pick up a finished tyre from the latter and transfer it to the first work station 5, where the tyre is removed from the corresponding toroidal support by means of the robotic arm R8. The toroidal support A extracted from the tyre is then transferred by the first robotic arm R1 from the first work station 5 into the temperature stabilizing device 21.

If the type to be produced requires the use of a toroidal support different from that which has been dismantled previously, the robotic arm R1 picks up the appropriate toroidal support from the feed station 20 and inserts it into the temperature stabilizing device 21.

This device 21 brings the toroidal support to an adequate temperature to permit the subsequent processing, and particularly to promote the adhesion of the first layer of elastomeric material to the metal of the support. This temperature is preferably in the range from 80° C. to 90° C.

A second robotic arm R2 serves to transfer the toroidal support from the temperature stabilizing device 21 to the second work station 6 where the first constructional components of the tyre are assembled. The assembly operation may, for example, comprise the coating of the outer surface of the toroidal support A with a thin layer of airtight elastomeric material, usually called liner, carried out by a liner processing unit 61, and the application of any necessary elastomeric strips in the areas corresponding to the beads of the tyre, carried out by strip processing units 62, and/or the formation of an additional lining layer made from elastomeric material and laid on top of the liner, carried out by the sub-liner processing unit 63.

Preferably, at the second work station 6, and also at the remaining work stations 7, 8, 9, 10, the formation of each structural component of the tyre is carried out in conjunction with the previously described stage of assembly, by the processing of at least one basic semi-finished product which is identical for each type of tyre A or B and supplied in a predetermined quantity according to the type of tyre to be constructed.

In particular, at the second work station 6 the production of the liner, the elastomeric strips and/or the additional lining layer can advantageously be carried out by winding at least one strip-shaped element made from elastomeric material on to the toroidal support A being processed, in consecutively adjacent and if necessary also at least partially superimposed turns, this element having a width, for example, in the range from 0.5 to 3 cm, and being drawn directly from a corresponding extruder, from a reel or from other suitable feed devices associated with the second work station 6.

The winding of the turns can be advantageously simplified by giving the second robotic arm R2 the function of holding the toroidal support A, by means of suitable gripping and driving members, and making it rotate about its own axis, thus moving it suitably in front of pressure rollers or equivalent application devices (not described) combined with feed devices, in such a way as to produce a correct distribution of the strip with respect to the outer surface of the toroidal support. For further details of the procedure for the application of the structural components on a toroidal support with the aid of a robotic arm, reference should be made to European patent application no. 98830762.5 in the name of the present applicant.

When the assembly of the components at the second work station 6 has been completed, the second robotic arm R2 deposits the toroidal support, with the corresponding tyre under construction, at the first holding station 22. A third robotic arm R3 picks up the toroidal support from the first holding station 22 to transfer it to the third work station 7, where the structural components which contribute to the formation of the carcass structure of the tyre are assembled.

More particularly, at the third work station 7 one or more carcass plies are produced and assembled, together with a pair of annular reinforcing structures in the areas corresponding to the beads of the tyre. In a similar way to that described with reference to the operating stages carried out at the second work station 6, each of these structural components is produced directly at the assembly stage, using a basic semi-finished product supplied in a predetermined quantity according to the type of tyre being processed.

For example, the carcass ply or plies can be formed by sequentially depositing on the toroidal support a plurality of strip pieces, cut individually from a continuous strip element formed by a band of rubberized cords laid parallel to each other. In turn, each annular reinforcing structure can comprise a circumferentially inextensible insert consisting, for example, of at least one metal wire element wound in a plurality of radially superimposed turns, together with a filler insert of elastomeric material which can be made by applying an elongate elastomeric element wound in a plurality of axially adjacent and/or radially superimposed turns.

Each of the said continuous strip element, metal wire element and elongate elastomeric element, which form the basic semi-finished product to be used in a predetermined quantity to produce the corresponding structural component, can be taken directly from an extruder, from a reel or from other suitable feed devices associated with the third work station 7.

For further explanations of the procedure for producing the carcass structure, reference should be made to European Patent Application No. 98830472.1 in the name of the present applicant.

In the layout shown in the attached figure, the third work station 7 is designed to produce carcass structures such as those described in European Patent Application No. 98830662.7, also in the name of the present applicant. The carcass structure described in this patent application comprises two carcass plies, each consisting of a first and a second series of strip pieces deposited in an alternating sequence on the toroidal support. A pair of annular reinforcing structures of the type described previously is also provided in each bead of the tyre, each of these structures being inserted between the terminal flaps of the pieces, belonging to the first and second series respectively, and forming one of the carcass plies, together with an inextensible insert applied externally with respect to the second carcass ply.

To facilitate the sequential assembly of the various structural components in the predetermined order, the third work station 7 is made to be equipped with at least three different processing units designed respectively, for the deposition of the strip pieces (unit 71), of the metal-wire element (unit 72), and of the elongated elastomeric element (unit 73), which operate simultaneously, each on a corresponding tyre being processed. Consequently, three tyres, even if they are of different types from each other, can be treated simultaneously in the third work station 7, each of the tyres being sequentially transferred from one to another of the processing units until the carcass structure has been completed. The sequential transfer of the tyres into the various processing units provided at the third station 7 can be carried out by the third robotic arm R3 assisted, if necessary, by a fourth robotic arm R4 and/or by any necessary auxiliary transfer devices and by the multiple holding station 23, at which more than one toroidal support can be present at the same time. This system makes it possible to minimize the waiting periods when the tyres being processed in this work station are of types which differ from each other. This is because it is possible to use the multiple holding station 23 to carry out processing on types which require a longer time at the most favourable moment, by advantageously altering the order of the sequence of arrival of the toroidal supports at the work station. In the attached FIG. 1, the unit 71 for depositing the carcass plies is engaged with a type B tyre and the unit 72 for depositing the bead wires is engaged with a type A tyre.

On completion of the carcass structure, the fourth robotic arm R4 deposits the toroidal support at the second holding station 24.

The fifth robotic arm R5 picks up the toroidal support from the second holding station 24, to carry it to the fourth work station 8, which in the illustrated example is occupied by a type A toroidal support. At the fourth work station 8, the structural components serving to form what is known as the belt structure of the tyre are produced and assembled. In particular, a first processing unit 81 provided at the fourth work station 8 deposits, directly on the previously formed carcass structure, two under-belt strips extending circumferentially in the shoulder areas of the tyre. These under-belt strips can be extruded directly from an extruder and applied with the aid of pressure rollers or equivalent application devices. A second processing unit 82 forms a first and second belt strip on the carcass structure, each strip being formed by the sequential deposition of strip pieces laid adjacent to each other circumferentially, each piece being made by cutting to size a continuous strip element consisting of a plurality of cords adjacent and parallel to each other and incorporated in an elastomeric layer. A further processing unit 83 forms a further belt strip winding a continuous cord in turns which are axially adjacent to each other and radially superimposed on the underlying belt layers. Further details of a possible procedure for producing the belt structure are described in European Patent Application No. 97830633.0, in the name of the present applicant.

When the belt structure has been completed, the sixth robotic arm R6 transfers the tyre being processed to the fifth work station 9. At the fifth work station 9, the toroidal support B is engaged by the robotic arm R6 with the aid of which a tread band is applied, this tread band being produced by the winding of at least one further elastomeric strip element in consecutively adjacent and superimposed turnings until a tread band having the desired configuration and thickness is obtained. In the illustrated example, the operation is carried out by two units 91 and 92. When the aforesaid operations have been completed, the sixth robotic arm R6 deposits the toroidal support at the third holding station 25.

The tyre is then transferred to the sixth work station 10, occupied by a type A tyre in the illustrated example. At the sixth work station 10, the toroidal support is engaged by the seventh robotic arm R7 which causes it to move suitably in front of corresponding processing units to carry out the application of abrasion-resistant elements to the areas corresponding to the beads (unit 101), and the application of the sidewalls, which are also produced by winding at least one elastomeric strip in adjacent and/or superimposed turns (unit 102).

When this operation is finished, the seventh robotic arm R7 deposits the manufactured tyre at the terminal holding station 26, before the tyre is transferred to the complex vulcanizing unit 3.

Each of the work stations 5, 6, 7, 8, 9, 10 not only has one or more processing units, but also comprises a feed device for supplying the basic elements required for the production of the corresponding structural component, operating in conjunction with application devices present in the aforesaid units, which apply the basic element and/or the resulting structural component to the tyre being processed.

The complex vulcanizing unit 3 advantageously comprises at least one set of vulcanizing moulds 34, 35, 36, 37, 38, 39, the number of which is equal to the quantity of tyres included in the said at least one series of tyres being processed in the complex manufacturing unit 2. In the illustrated example, six vulcanizing moulds 34, 35, 36, 37, 38, 39 are provided, each corresponding to the specification of one of the types of tyre manufactured along the line of the complex manufacturing unit 2.

Preferably, the moulds 34, 35, 36, 37, 38, 39 are mounted on a rotatable platform 30 which can be rotated with a step-by-step movement, in such a way that the moulds are made to follow a path, within the complex vulcanizing unit 3, to bring them sequentially, one after the other, next to a loading and discharge station 40 for the tyres being processed. This rotation preferably takes place with a first rotation in a first direction of rotation, followed by a rotation in the direction opposite the first. Alternatively, this rotation may be of the closed loop type.

Each of the moulds 34, 35, 36, 37, 38, 39 is fed with pressurized steam through a corresponding connecting line (not shown) extending radially from a central column in which steam supply devices, consisting of a boiler for example, are integrated or connected in another way. The whole rotatable platform 30 can advantageously be enclosed in an insulated structure having at least one access aperture located next to the loading and discharge station 40, in order to prevent excessive dissipation of heat to the exterior.

Advantageously, the transfer of the individual tyre being processed into the corresponding moulds 34, 35, 36, 37, 38, 39 is carried out by the robotic arm R1 at a rate equal to the rate of completion of the crude tyres being processed in the work stations distributed along the line of the complex manufacturing unit 2.

Figure 2:
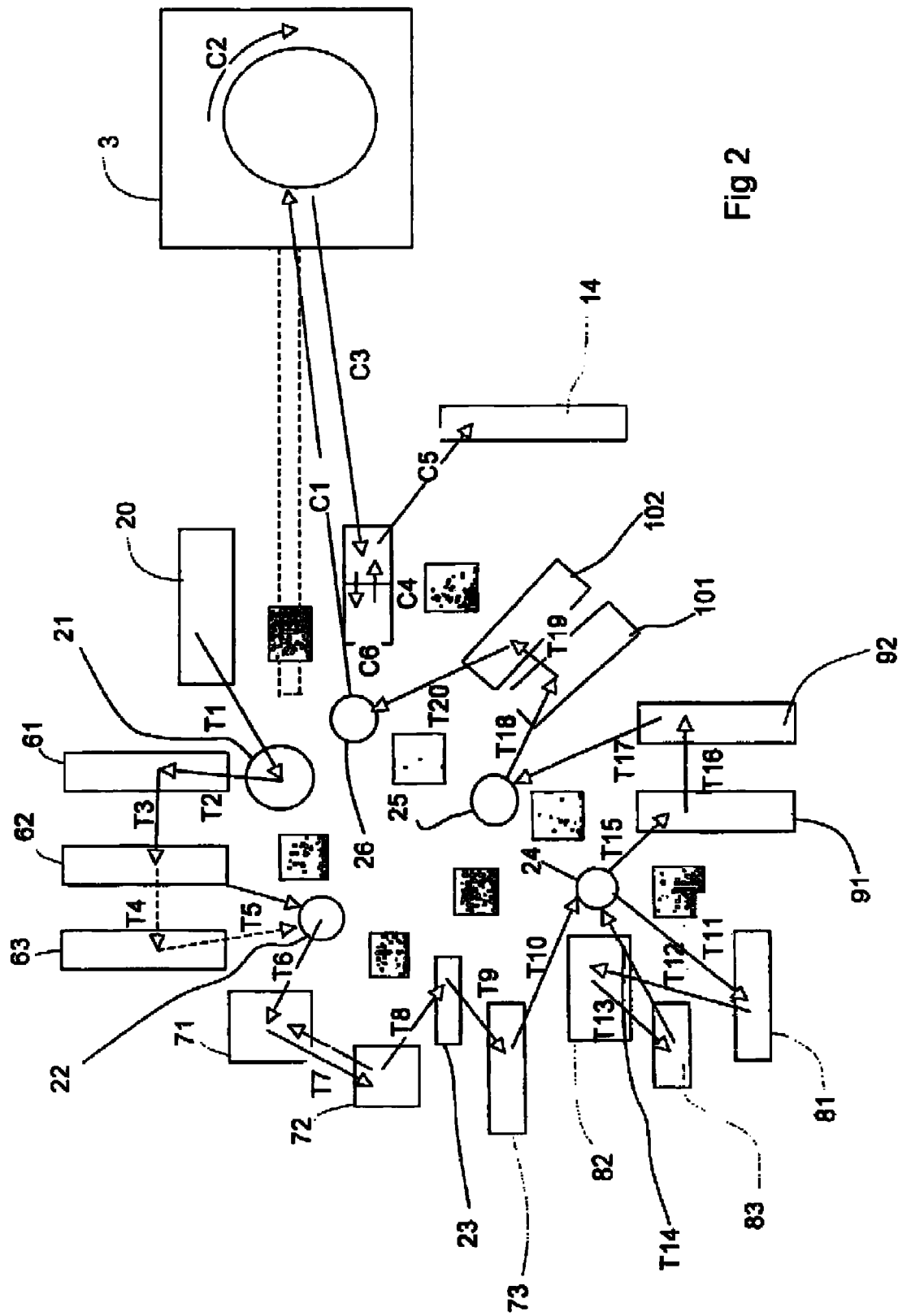
FIG. 2 shows schematically the stages of a tyre production process according to the present invention.

The plant described by way of example operates in the following steps, shown schematically in FIG. 2 and associated with the movements of the robotic arms R1, R2, R3, R4, R5, R6, R7 and R8. In the figure, and in the remainder of the present description, the steps identified by the letter T followed by a progressive number refer to the manufacturing of a crude tyre, and the steps identified by the letter C followed by a progressive number refer to the vulcanization of the tyre and to the dismantling of the toroidal support.

T1) The robotic arm R1 picks up a toroidal support, termed the "core" below, from the feed station 20, and inserts it in the temperature stabilizing device 21.

T2) The core is extracted from the device 21 by the robotic arm R2 and is positioned in front of an extrusion head of the unit 61. The arm R2 rotates the core in such a way that the extruder deposits a strip of elastomeric material on the surface of the core.

T3) The robotic arm R2 positions the core in front of an extrusion head of the unit 62. The arm R2 rotates the core in such a way that the extruder deposits a strip of elastomeric material on the specified portion of the surface of the core.

T4) (optional) The robotic arm R2 positions the core in front of an extrusion head of the unit 63. The arm R2 rotates the core in such a way that the extruder deposits a strip of elastomeric material close to the beads of the core.

T5) The core is deposited by the robotic arm R2 at the first holding station 22.

T6) The robotic arm R3 picks up the core from the first holding station 22 and inserts it into the carcass ply deposition unit 71, at which a first layer of carcass ply pieces is deposited.

T7) The robotic arm R3 picks up the core from the carcass ply deposition unit 71 and inserts it into the bead wire deposition unit 72, within which a pair of annular reinforcing structures is deposited on the core in the areas corresponding to the beads of the tyre.

T8) The robotic arm R3 picks up the core from the bead wire deposition unit 72 and deposits it in one of the locations of the multiple holding station 23.

T9) The robotic arm R4 picks up the core from the holding position 23 and places it in front of an extrusion head of the elastomeric filler deposition unit 73. The arm R4 rotates the core in such a way that the extruder applies a strip of elastomeric material on the beads of the tyre being processed.

The preceding three steps can be repeated a number of times, according to the type of tyre which is being produced. For this purpose, the multiple holding station 23, having multiple locations, each capable of holding one core, is provided, together with two robotic arms R3 and R4 for producing the carcass structure.

T10) The robotic arm R4 deposits the core at the second holding position 24.

T11) The robotic arm R5 picks up the core from the second holding position 24 and places it in front of an extrusion head of the under-belt strip deposition unit 81. The arm R5 rotates the core in such a way that the extruder deposits a strip of elastomeric material in the shoulder areas of the tyre.

T12) The robotic arm R5 inserts the core into the belt strip deposition unit 82.

T13) The robotic arm R5 picks up the core from the unit 82 and inserts it into the processing unit 83 which forms a further belt layer by winding a continuous cord in turns axially adjacent to each other and radially superimposed on the underlying belt layers.

T14) The robotic arm R5 deposits the core back in the second holding position 24.

T15) The robotic arm R6 picks up the core from the second holding position 24 and places it in front of an extrusion head of the under-tread strip deposition unit 91. The arm R6 rotates the core in such a way that the extruder deposits a strip of elastomeric material on the crown area of the tyre being processed.

T16) The robotic arm R6 places the core in front of an extrusion head of the tread band deposition unit 92. The arm R6 rotates the core in such a way that the extruder deposits a strip of elastomeric material on the crown area of the tyre being processed.

T17) The robotic arm R6 deposits the core at the third holding station 25.

T18) The robotic arm R7 picks up the core from the third holding station 25 and places it in front of an extrusion head of the abrasion-resistant layer deposition unit 101. The arm R7 rotates the core in such a way that the extruder deposits a strip of elastomeric material on the beads of the tyre being processed.

T19) The robotic arm R7 places the core in front of an extrusion head of the sidewall deposition unit 102. The arm R7 rotates the core in such a way that the extruder deposits a strip of elastomeric material on the sides of the tyre being processed.

T20) The robotic arm R7 deposits the core at the terminal holding station 26.

The crude tyre is now complete; the subsequent steps are concerned with the vulcanization of the tyre and its removal from the core.

C1) The robotic arm R1 picks up the core, with the crude tyre manufactured on it, and transfers it to the complex vulcanizing unit, and in particular into a vacant vulcanizing mould 39.

C2) The vulcanizer closes the mould and rotates by one position. The tyre is vulcanized in the period of one complete rotation of the vulcanizing apparatus. At the end of each step of this rotation, each of the other moulds is loaded with a crude tyre to be vulcanized.

C3) The first robotic arm R1 picks up the vulcanized tyre, together with the corresponding toroidal support, from the mould 39, and deposits it at the first manufacturing station 5, in a station 16 for dismantling the toroidal support.

C4) The eighth robotic arm R8 removes the toroidal support and deposits it in a recovery station 28.

C5) The eighth robotic arm R8 picks up the vulcanized tyre and deposits it on a storage platform 14 where the tyres produced previously by the plant can be placed while they are waiting to be sent to the subsequent finishing and inspection stages.

The procedure for treating the individual tyres along the line of the complex manufacturing unit 2 is such that the deposition of a structural component can advantageously be carried out independently of the completion of the production of another component on the immediately preceding tyre in the production process. A characteristic of the invention is that the structural components of the tyre are prepared essentially at the moment of their deposition, thus making it possible to operate without previously stored semi-finished products, and to adapt each unit immediately to the type of tyre being processed, thus avoiding wastage of material.

Additionally, the operation of each of the processing units located at the individual work stations 5, 6, 7, 8, 9, 10, and that of each of the robotic arms, is controlled by a programmable local processing unit, in such a way that the quantity of basic semi-finished products supplied is controlled appropriately, together with the movement imparted to the toroidal support, to ensure that the individual structural components of the tyres being processed are correctly formed. In particular, this local processing unit can be programmed in such a way as to adapt the operation of the processing units of the robotic arms to the type of tyre being treated from time to time in each individual work station.

Moreover, in order to impart greater operating flexibility to the plant, without limitation to predetermined sequences of different types of tyre, provision is preferably made to associate each of the work stations 5, 6, 7, 8, 9, 10 with devices for identifying the type of tyre being processed, interacting with selection devices to determine the quantity of basic element to be used for producing each structural component in the work station in question. For example, these identification devices can advantageously comprise a reader of bar codes or other types of code associated with the toroidal support of the tyre, which can be identified, by means of suitable reading devices, by the local processing unit, for the purpose of selecting the quantity of semi-finished product, for example by using preset tables of values.

At the moment at which a tyre is transferred to any of the work stations 5, 6, 7, 8, 9, 10, the bar code reader identifies the type to which the tyre belongs, enabling the local processing unit to set the operating program of the work station in a suitable way, in addition or as an alternative to the instructions received from the central unit.

The movement of the tyres being processed is advantageously managed in the form of a continuous flow in which the complex manufacturing unit 2 is directly connected to the complex vulcanizing unit 3, the sequential transfer of the individual tyres being carried out at a rate equal to the rate of completion of the tyres in the complex manufacturing unit 2, thus advantageously eliminating the need for storing crude tyres in storage buffers provided between the complex manufacturing unit and the complex vulcanizing unit.

The possibility of changing the assembly sequence of the various structural components according to the type of crude tyre to be produced enables the average manufacturing time to be matched to the vulcanizing time.

In the preceding description, the production of two different types of tyres, A and B, was covered by way of example. The first type A relates to a tyre having the 195/65 R15 specification, with what is known as a "single-ply" carcass structure, and the type B relates to a tyre having the 215/45 R17 specification, with what is known as a "two-ply" carcass structure. The type A comprises a single layer of carcass plies, while the type B comprises a double layer of carcass plies. Because of the diversity of dimensions and consequently the different volumes of the two different types, the processes carried out on type B require a longer time than the processes carried out on type A. However, while the processes at the first, second, fourth and fifth work stations are compatible with the total cycle times, the process at the third work station 7, at which the carcass structures are produced, is significantly different for the two types, particularly in that it requires the repetition of the deposition of a layer of carcass plies for type B.

If the processes described above were carried out in succession, it would then be necessary either to extend the cycle time by adapting them to the type which requires the longer times, or to provide an additional work station.

However, the pair of robotic arms R3 and R4 and the multiple holding station 23 are able to change the processing sequence.

For example, if the first tyre to arrive at the third work station 7 is a type B tyre, in other words the one requiring a longer processing time, the pre-set processing sequence is modified. This is made possible by the fact that some processes require a time shorter than the rate required to keep the complex vulcanizing unit always supplied with a tyre for each rotation of the rotatable platform 30. Thus it is possible to recover useful time for making the change in the sequence.

The processing time in each processing unit and the rate of transfer are determined according to the number of steps of movement required along the line of the complex vulcanizing unit 3, in such a way that each tyre A, B can remain in the complex vulcanizing unit for a time at least sufficient to complete the vulcanization process.

For example, at the carcass structure production station (third work station) type A requires a minimum processing time of approximately 1.5 minutes, and type B requires a minimum processing time of approximately 3 minutes, owing to the fact that this type requires a double application of the carcass plies, as described above.

At the work stations which apply the liner and sub-liner (second work station), the belt structure (fourth work station), the sidewalls and the abrasion-resistant strip (sixth work station), the (minimum) processing time is less than 2.5 minutes for both types A and B. The work station which applies the tread band (fifth work station) requires a (minimum) processing time of approximately 2.5 minutes for both types A and B.

The complex vulcanizing unit 3 has six vulcanizing moulds; to carry out vulcanization in the chosen conditions, each mould is required to remain in the vulcanizer for 15 minutes. To achieve this vulcanizing time while the rotatable support of the vulcanizer carries out six steps of rotation, one cover has to be fed to the complex vulcanizing unit once every 15:6=2.5 minutes.

According to the data supplied above, this time is compatible with the times of the stations 6, 8, 9 and 10, while the third work station 7 is critical, since type B requires a processing time here which is too long for the desired rate.

In order to enable the third step to be carried out, a plurality of series of types which are initially fed to the complex manufacturing unit is provided.

Each series consist of a number of tyres equal to the number of the vulcanizing moulds.

Each series consists of three type A tyres and three type B tyres, according to a first order, defined as follows: A1 B1 B2 A2 B3 A3 (the numbers 1, 2, 3 etc. associated with each type A, B in the sequence identify the succession in time of the different types of tyre fed in the sequence).

After the application of the liner and the sub-liner (second work station) the order in each series remains unaltered.

At the third work station, the processing sequence requires, for example, the execution of the following consecutive steps:

1. production of the single carcass ply on A1; A1 continues to the following work stations;
2. production of the first carcass ply on B1; B1 is put to wait in the multiple holding station 23;
3. production of the first carcass ply on B2; B2 is put to wait in the multiple holding station 23 (in a different location from that occupied by B1);
4. production of the second carcass ply on B1; B1 continues to the following work stations;
5. production of the single carcass ply on A2; A2 continues to the following work stations;
6. production of the second carcass ply on B2; B2 continues to the following work stations;
7. production of the first carcass ply on B3; B3 is put to wait in the multiple holding station 23;
8. production of the single carcass ply on A3; A3 continues to the following work stations;
9. production of the second carcass ply on B3; B3 continues to the following work stations.

After the third work station, the series has a second order, as follows: A1 B1 A2 B2 A3 B3; this second order is different from the initial order. The number of steps carried out is nine; each step requires a processing time of 1.5 minutes, and therefore the total time for which the work station is occupied in applying the carcass structure on the six tyres is 1.5×9=13.5 minutes. The total time is less than 15 minutes, representing the desired rate for the vulcanization of six tyres.

As a result of the pre-set order of the series, together with the steps carried out at the third work station as described above, the time for the production of the carcass structure on type B is no longer critical.

In this example, the order is not modified further at the following work stations, and the rate of 2.5 minutes is maintained in all the following stations, since they all require a processing time which is less than or equal to 2.5 minutes.

Additionally, type A1 is ready for the following station after 1.5 minutes, whereas another 4.5 minutes elapse between it and the next type B1.

In the following processes, type A1 can be slowed by approximately 1 minute, while the processing of type B1 has to be accelerated by 1 minute. The slowing is carried out by the holding station 23, or by slowing the rate of application of one or more of the subsequent components.

The acceleration of type B1 is achieved by carrying out the following processing in the minimum time, particularly by carrying out the operations of depositing the belt structure and sidewalls in 2 minutes each.

The vulcanizing moulds are arranged in accordance with the second order, in other words in the sequence A1 B1 A2 B2 A3 B3, in such a way as to receive type A where a vulcanizing mould for this type is provided.

The series follow each other along the manufacturing and vulcanizing lines until the end of the critical period, at which point the moulds can be replaced if different types are to be produced in the following critical period.

With the procedure described above, within a critical period of, for example, eight hours, 96 type A tyres and 96 type B tyres are produced.

In view of the above, for two types, such as A and B, it is necessary to specify a series in which one type B is followed by at least one type A, such that the sum of the times for the processing of the type A tyres by a predetermined work station (for example that in which B undergoes the same process at least twice) up to the end of the manufacturing of the crude tyre is shorter than the average total time of the said processes by a time corresponding to the time difference between the types A and B in the said predetermined stage.

This makes it possible to carry out the processing step which requires the longest time without causing a delay in the execution of the following steps.

A change in the order of the series at the third work station 7 which forms the carcass structure was described above; the present invention is also applicable to types of tyres which also differ from each other in the deposition of other components, for example the belt structures. In this case, the sequence will also be modified at the fourth work station 8, by providing a further multiple holding station.

More generally, according to the location of the critical stage in the processing sequence, the steps will be accelerated or the waiting times between the stages preceding or following the said critical stage will be reduced, in such a way as to compensate for the excess time introduced by the critical step.

Where necessary, a special holding station can be provided.

In the plant according to the present invention, the pre-set series and the modifications of the order of each series are made possible by the functional transfer and movement devices, particularly the robotic arms, which enable the processing steps to be disassociated from each other. This is because a change in the order of the series means that one type of tyre follows a different processing path from that of another type. The functional transfer and movement devices make it possible, within a single critical operating period, to use a number of paths simultaneously, one for each type of tyre being processed.

Each series represents a time package of steps organized in paths, each of these corresponding to one type of tyre produced. The path through the various processing steps determines the type of tyre manufactured.

Additionally, the numbers of the said holding stations, of the said moulds, and of the said functional transfer and movement devices can vary according to how many, and which, types of tyre are to be produced within a critical period, as well as in relation to the performance of the equipment used.

When required, it is also possible to reduce the effective time of the vulcanization process carried out on the individual tyres, for example by retarding the injection of the steam into the mould 34, 35, 36, 37, 38, 39 after the tyre has been introduced into it. It is therefore possible, alternatively, to set different effective vulcanization times for the various types of tyre being processed.

The present invention also makes it possible to eliminate or at least to minimize the downtimes on each occasion when a type of tyre being produced is changed.

This is because, in these cases, the toroidal supports and the vulcanizing mould suitable for the production of one type have to be replaced with toroidal supports and the vulcanizing mould suitable for the production of the new type.

This replacement, which, however, is required only when the dimensional and/or tread pattern characteristics are changed, can be carried out with minimal effect on output, by providing suitable equipment if necessary.

The invention therefore makes it possible to conveniently produce tyres in very small batches, down to a few units, without requiring significant increases in the unit cost of the tyres.

The invention claimed is:

1. A plant for producing types of tyres different from each other, comprising:
    a manufacturing unit comprising a plurality of work stations, wherein at least one work station is configured to receive a series of tyres to be produced, the series comprising a sequence of tyres comprising at least a first and a second type of tyre arranged in a predetermined order;
    a device for transfer and movement of the tyres being produced, comprising at least two robotic arms;
    a holding station, capable of holding multiple tyres being produced, associated with the at least one work station for modifying the order of the series within the at least one work station, the holding station accessible by the at least two robotic arms; and
    a vulcanizing unit comprising vulcanizing moulds for the tyres being produced,
    wherein each work station is configured to assemble at least one corresponding structural component on at least one type of tyre being produced.

2. The plant of claim 1, wherein the device for transfer and movement moves tyres between two or more work stations according to a preset sequence.

3. The plant of claim 1, wherein the device for transfer and movement operates to transfer manufactured tyres from the manufacturing unit to the vulcanizing unit at a rate of transfer equal to a rate of moving of the tyres being manufactured to and from the corresponding work stations arranged in the manufacturing unit.

4. The plant of claim 1, wherein each of the work stations comprises:
    feed devices for supplying at least one element for making the at least one corresponding structural component; and
    application devices for applying the at least one corresponding structural component to the tyre being produced;
    wherein the at least one corresponding structural component is made with the at least one element in a quantity predetermined according to the type of tyre being produced.

5. The plant of claim 4, wherein each of the work stations is associated with:
    devices for identifying the type of tyre being produced; and
    selection devices for determining the quantity of the at least one element.

6. The plant of claim 5, wherein the devices for identifying comprise at least one sensor of the manufacturing unit designed to read at least one code associated with a toroidal support or toroidal drum of the tyre being produced.

7. The plant of claim 1, wherein the device for transfer and movement operates on a toroidal support or toroidal drum on which the structural components are assembled to sequentially move tyres being manufactured to and from the work stations arranged in the manufacturing unit and to transfer manufactured tyres to the vulcanizing unit.

8. The plant of claim 1, wherein at least one of the robotic arms comprises pickup and driving members operating on a toroidal support or toroidal drum to hold the toroidal support or toroidal drum in front of the at least one work station and to make the toroidal support or toroidal drum rotate about a geometrical axis during assembly of the at least one corresponding structural component.

9. The plant of claim 1, wherein at least one of the work stations comprises a plurality of processing units, and
  wherein each processing unit is designed to assemble one or more structural components on the tyres being produced.

10. A plant for producing types of tyres different from each other, comprising:
  a manufacturing unit comprising a plurality of work stations, wherein a first work station is configured to receive a series of tyres to be produced, the series comprising a sequence of tyres comprising at least a first and a second type of tyre arranged in a predetermined order;
  a device for transfer and movement of the tyres being produced, comprising at least two robotic arms;
  a holding station, capable of holding multiple tyres being produced, associated with the first work station for modifying the order of the series within the first work station, the holding station accessible by the at least two robotic arms;
  a vulcanizing unit comprising vulcanizing moulds for the tyres being produced; and
  a central processing unit,
  wherein each work station is designed to assemble at least one corresponding structural component on at least one type of tyre being produced, and
  wherein the central processing unit controls the device for transfer and movement to coordinate processing stages for each type of tyre in the manufacturing unit and in the vulcanizing unit.

11. A plant for producing types of tyres different from each other, comprising:
  a manufacturing unit comprising a plurality of work stations, wherein a first work station is configured to receive a series of tyres to be produced, the series comprising a sequence of tyres comprising at least a first and a second type of tyre arranged in a predetermined order;
  a device for transfer and movement of the tyres being produced, comprising at least two robotic arms;
  a vulcanizing unit comprising vulcanizing moulds for the tyres being produced; and
  a holding station, capable of holding multiple tyres being produced, associated with at least one of the work stations for modifying the order of the series within the manufacturing unit, the holding station accessible by the at least two robotic arms,
  wherein each work station is configured to assemble at least one corresponding structural component on at least one type of tyre being produced.

12. A plant for producing types of tyres different from each other, comprising:
  a manufacturing unit comprising a plurality of work stations, wherein at least one work station is configured to receive a series of tyres to be produced, the series comprising a sequence of tyres comprising at least a first and a second type of tyre arranged in a predetermined order;
  a device for transfer and movement of the tyres being produced, comprising at least two robotic arms, wherein the device for transfer and movement operates on a toroidal support or toroidal drum on which the structural components are assembled, wherein an external shape of the toroidal support or toroidal drum essentially reproduces an internal configuration of the tyres being produced;
  a holding station, capable of holding multiple tyres being produced, associated with the at least one work station for modifying the order of the series within the at least one work station, the holding station accessible by the at least two robotic arms; and
  a vulcanizing unit comprising vulcanizing moulds for the tyres being produced,
  wherein each work station is configured to assemble at least one corresponding structural component on at least one type of tyre being produced,
  wherein one of the at least two robotic arms comprises a device configured to transfer manufactured tyres from the manufacturing unit to the vulcanizing unit at a rate of transfer equal to a rate of moving of the tyres being manufactured to and from the corresponding work stations arranged in the manufacturing unit.

13. The plant of claim 12, wherein the device for transfer and movement moves tyres between two or more work stations according to a preset sequence.

14. The plant of claim 12, wherein each of the work stations comprises:
  feed devices for supplying at least one element for making the at least one corresponding structural component; and
  application devices for applying the at least one corresponding structural component to the tyre being produced;
  wherein the at least one corresponding structural component is made with the at least one element in a quantity predetermined according to the type of tyre being produced.

15. The plant of claim 14, wherein each of the work stations is associated with:
  devices for identifying the type of tyre being produced; and
  selection devices for determining the quantity of the at least one element.

16. The plant of claim 15, wherein the devices for identifying comprise at least one sensor of the manufacturing unit designed to read at least one code associated with a toroidal support or toroidal drum of the tyre being produced.

17. The plant of claim 12, wherein at least one of the robotic arms comprises pickup and driving members operating on a toroidal support or toroidal drum to hold the toroidal support or toroidal drum in front of the at least one work station and to make the toroidal support or toroidal drum rotate about a geometrical axis during assembly of the at least one corresponding structural component.

18. The plant of claim 12, wherein at least one of the work stations comprises a plurality of processing units, and
  wherein each processing unit is designed to assemble one or more structural components on the tyres being produced.

* * * * *